(12) United States Patent
St. Aubin

(10) Patent No.: US 6,318,780 B1
(45) Date of Patent: Nov. 20, 2001

(54) SLIDING STORAGE DEVICE FOR THE BED OF A TRUCK

(76) Inventor: Alan H. St. Aubin, 19269 Auburndale, Livonia, MI (US) 48152

( * ) Notice: Subject to any disclaimer, the term of this patent is extended or adjusted under 35 U.S.C. 154(b) by 0 days.

(21) Appl. No.: 09/693,637

(22) Filed: Oct. 20, 2000

(51) Int. Cl.⁷ ........................................................ B62C 1/06
(52) U.S. Cl. ........................................ 296/26.09; 296/37.6
(58) Field of Search ............................... 296/37.6, 26.09, 296/26.08; 312/334.14, 334.15, 334.12

(56) References Cited

U.S. PATENT DOCUMENTS

| | | |
|---|---|---|
| D. 305,878 | 2/1990 | Schneider . |
| 2,784,027 | 3/1957 | Temp . |
| 5,088,636 | 2/1992 | Barajas . |
| 5,121,959 | 6/1992 | King . |
| 5,520,452 * | 5/1996 | Petersen et al. ................ 312/334.12 |
| 5,685,593 | 11/1997 | O'Connor . |
| 5,820,190 * | 10/1998 | Benner .............................. 296/26.09 |
| 5,934,725 * | 8/1999 | Bowers .............................. 296/26.09 |
| 6,065,792 * | 5/2000 | Sciullo et al. .................... 296/26.09 |

* cited by examiner

Primary Examiner—Joseph D. Pape

(57) ABSTRACT

A sliding storage device for the bed of a truck for more easily storing and retrieving items stored in the bed of a truck. The sliding storage device for the bed of a truck includes a sliding storage device for the bed of a truck that includes a bottom wall and a pair of side walls. The sliding storage device comprises a housing. The housing includes a bottom wall, a first side wall, a second side wall, an elongated front wall and an elongated back wall such that the housing has an open top. The bottom wall of the housing extends beyond the side walls such that a pair of flanges are defined. The flanges are movably positioned in a set of rail members. The set of rail members comprises a pair of female slide rails and a pair of males slide rails. The male slide rails are movably extended in the female slide rails.

15 Claims, 6 Drawing Sheets

SLIDING STORAGE DEVICE FOR THE BED OF A TRUCK

BACKGROUND OF THE INVENTION

1. Field of the Invention

The present invention relates to storage units and more particularly pertains to a new sliding storage device for the bed of a truck for more easily storing and retrieving items stored in the bed of a truck.

2. Description of the Prior Art

The use of storage units is known in the prior art. More specifically, storage units heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,784,027; U.S. Pat. No. 5,088,636; U.S. Pat. No. 5,121,959; U.S. Pat. No. 5,685,593; U.S. Pat. No. 5,820,190; and U.S. Pat. No. Des. 305,878.

While these devices fulfill their respective, particular objectives and requirements, the aforementioned patents do not disclose a new sliding storage device for the bed of a truck. The inventive device includes a sliding storage device for the bed of a truck that includes a bottom wall and a pair of side walls. The sliding storage device comprises a housing. The housing includes a bottom wall, a first side wall, a second side wall, an elongated front wall and an elongated back wall such that the housing has an open top. The bottom wall of the housing extends beyond the side walls such that a pair of flanges are defined. The flanges are movably positioned in a set of rail members. The set of rail members comprises a pair of female slide rails and a pair of males slide rails. The male slide rails are movably extended in the female slide rails.

In these respects, the sliding storage device for the bed of a truck according to the present invention substantially departs from the conventional concepts and designs of the prior art, and in so doing provides an apparatus primarily developed for the purpose of more easily storing and retrieving items stored in the bed of a truck.

SUMMARY OF THE INVENTION

In view of the foregoing disadvantages inherent in the known types of storage units now present in the prior art, the present invention provides a new sliding storage device for the bed of a truck construction wherein the same can be utilized for more easily storing and retrieving items stored in the bed of a truck.

The general purpose of the present invention, which will be described subsequently in greater detail, is to provide a new sliding storage device for the bed of a truck apparatus and method which has many of the advantages of the storage units mentioned heretofore and many novel features that result in a new sliding storage device for the bed of a truck which is not anticipated, rendered obvious, suggested, or even implied by any of the prior art storage units, either alone or in any combination thereof.

To attain this, the present invention generally comprises a sliding storage device for the bed of a truck that includes a bottom wall and a pair of side walls. The sliding storage device comprises a housing. The housing includes a bottom wall, a first side wall, a second side wall, an elongated front wall and an elongated back wall such that the housing has an open top. The bottom wall of the housing extends beyond the side walls such that a pair of flanges are defined. The flanges are movably positioned in a set of rail members. The set of rail members comprises a pair of female slide rails and a pair of males slide rails. The male slide rails are movably extended in the female slide rails.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sliding storage device for the bed of a truck apparatus and method which has many of the advantages of the storage units mentioned heretofore and many novel features that result in a new sliding storage device for the bed of a truck which is not anticipated, rendered obvious, suggested, or even implied by any of the prior art storage units, either alone or in any combination thereof.

It is another object of the present invention to provide a new sliding storage device for the bed of a truck which may be easily and efficiently manufactured and marketed.

It is a further object of the present invention to provide a new sliding storage device for the bed of a truck which is of a durable and reliable construction.

An even further object of the present invention is to provide a new sliding storage device for the bed of a truck which is susceptible of a low cost of manufacture with regard to both materials and labor, and which accordingly is then susceptible of low prices of sale to the consuming public, thereby making such sliding storage device for the bed of a truck economically available to the buying public.

Still yet another object of the present invention is to provide a new sliding storage device for the bed of a truck which provides in the apparatuses and methods of the prior art some of the advantages thereof, while simultaneously overcoming some of the disadvantages normally associated therewith.

Still another object of the present invention is to provide a new sliding storage device for the bed of a truck for more easily storing and retrieving items stored in the bed of a truck.

Yet another object of the present invention is to provide a new sliding storage device for the bed of a truck which includes a sliding storage device for the bed of a truck that includes a bottom wall and a pair of side walls. The sliding storage device comprises a housing. The housing includes a bottom wall, a first side wall, a second side wall, an elongated front wall and an elongated back wall such that the housing has an open top. The bottom wall of the housing extends beyond the side walls such that a pair of flanges are defined. The flanges are movably positioned in a set of rail members. The set of rail members comprises a pair of female slide rails and a pair of males slide rails. The male slide rails are movably extended in the female slide rails.

Still yet another object of the present invention is to provide a new sliding storage device for the bed of a truck that would combine the ability to organize with the ease of accessing the items organized.

Even still another object of the present invention is to provide a new sliding storage device for the bed of a truck that converts into a table top thereby providing a working surface.

Further still another object of the present invention is to provide a new sliding storage device for the bed of a truck that extends out of the bed of the truck making it easy to access.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic side view of the present invention showing the hinging means.

DESCRIPTION OF THE PREFERRED EMBODIMENT

Figure 1:
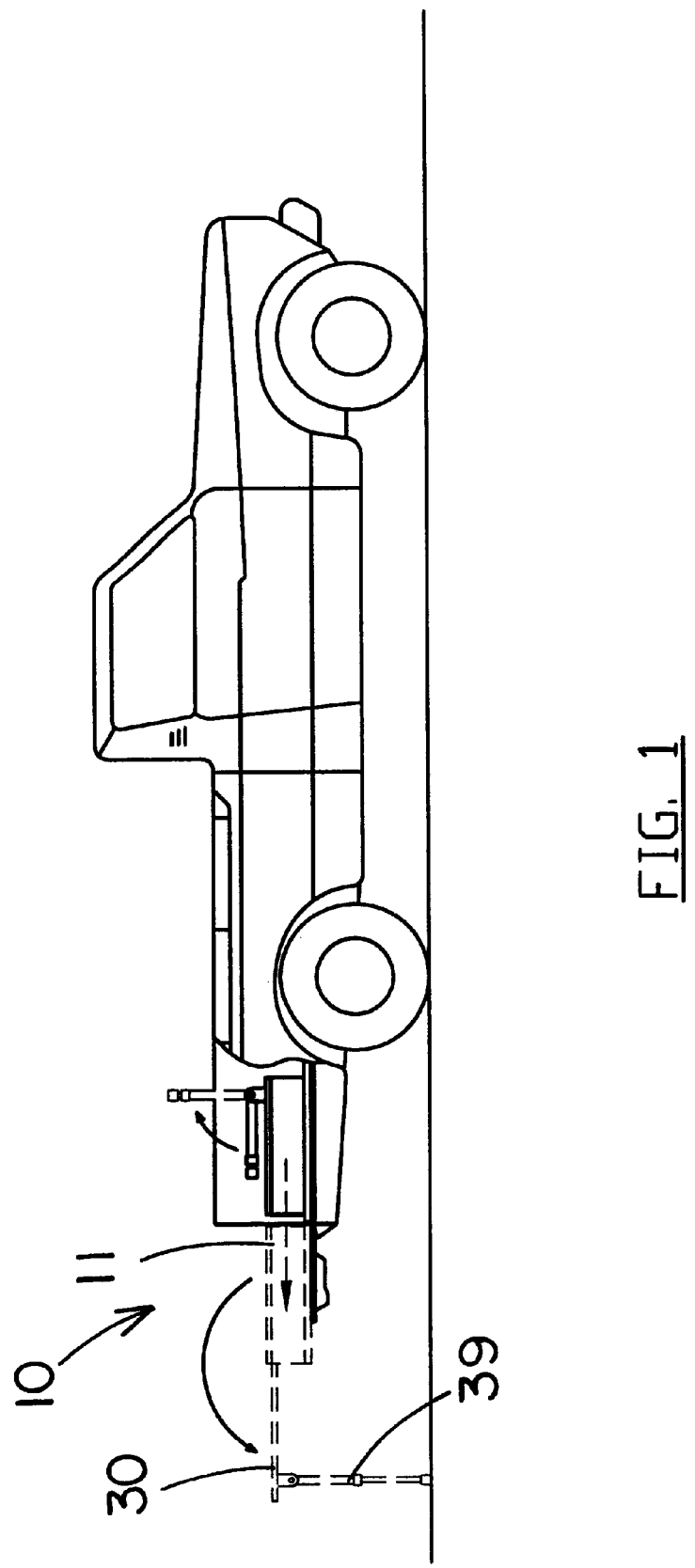
FIG. 1 is a schematic perspective view of a new sliding storage device for the bed of a truck according to the present invention.
Figure 2:
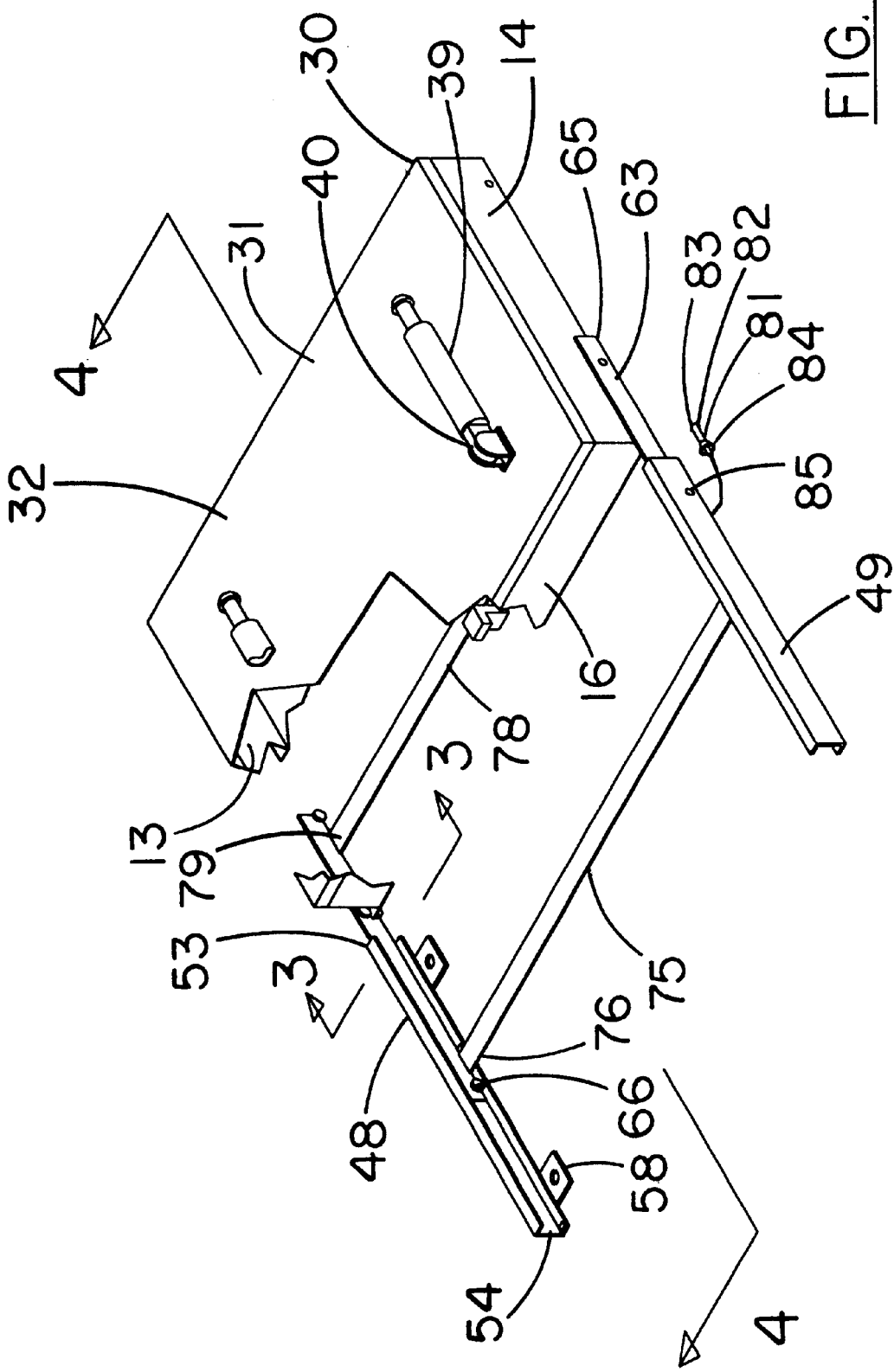
FIG. 2 is a schematic partial cut-away view of the present invention showing the set of rail members.
Figure 3:
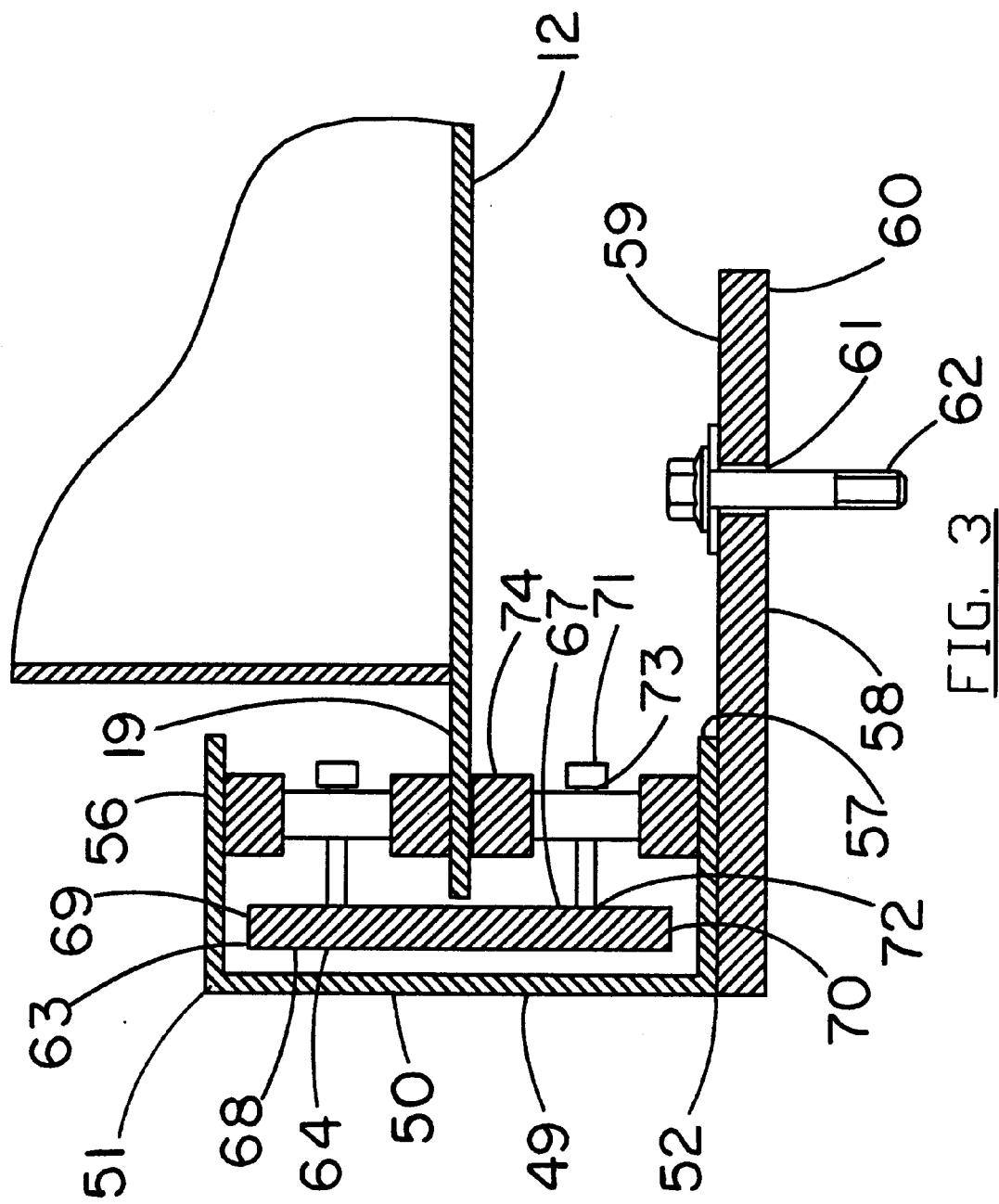
FIG. 3 is a schematic cross-sectional view of the present invention showing the male and female slide rails.
Figure 4:
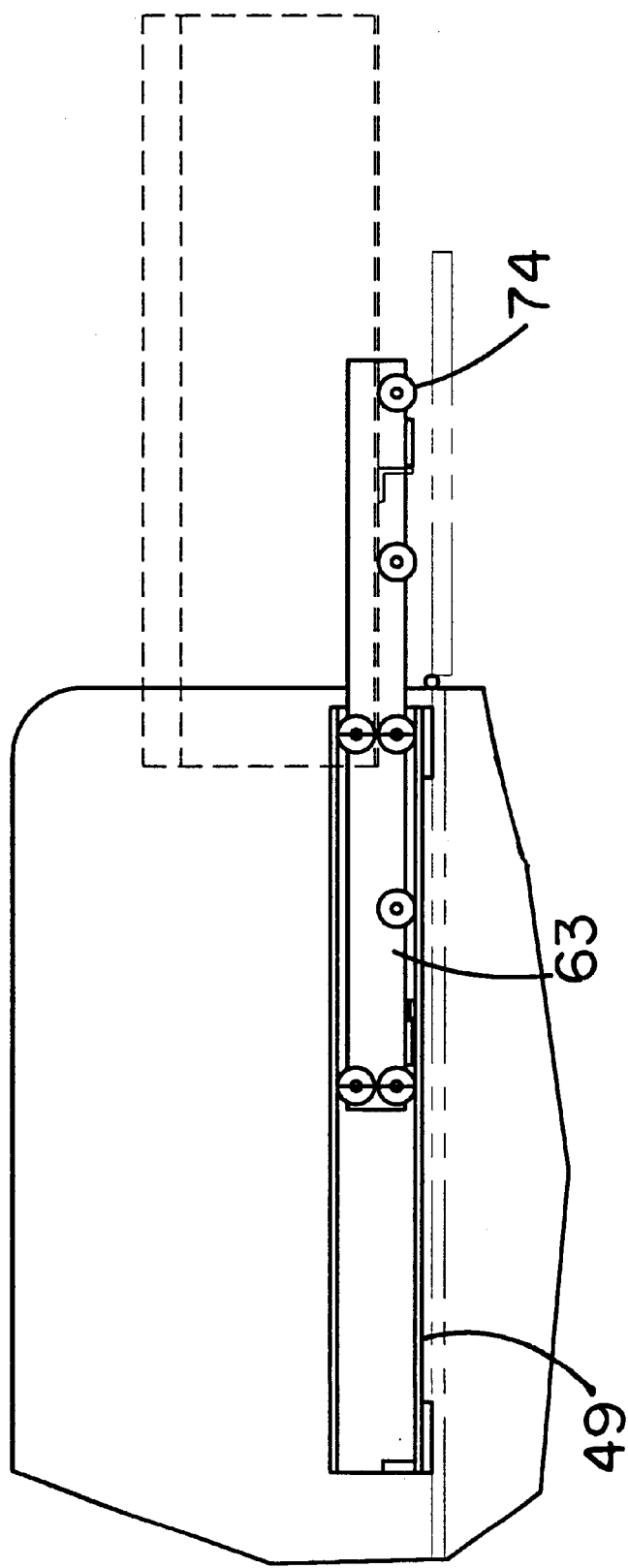
FIG. 4 is a schematic side view of the present invention.
Figure 5:
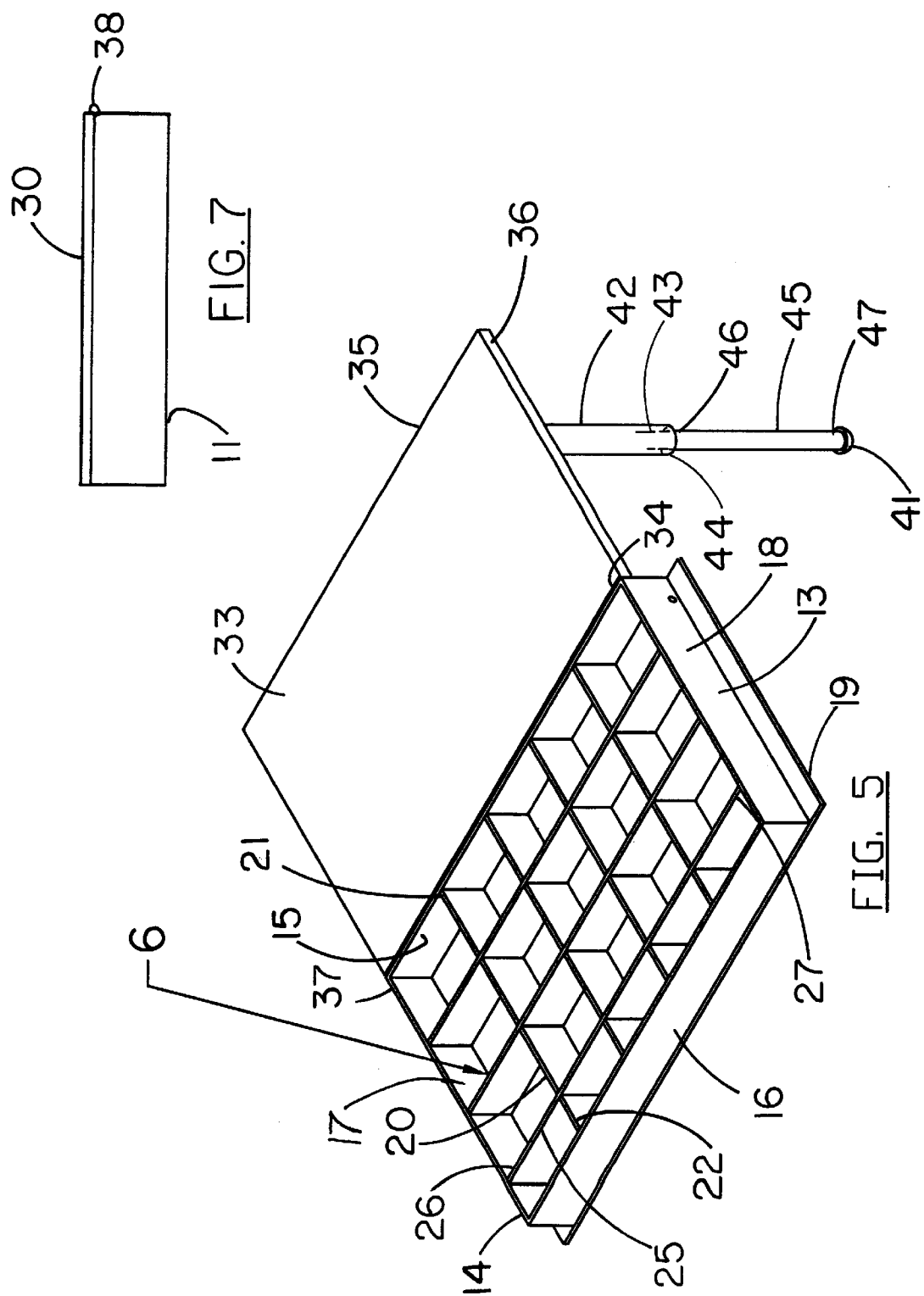
FIG. 5 is a schematic perspective view of the present invention showing the interior of the housing.
Figure 6:
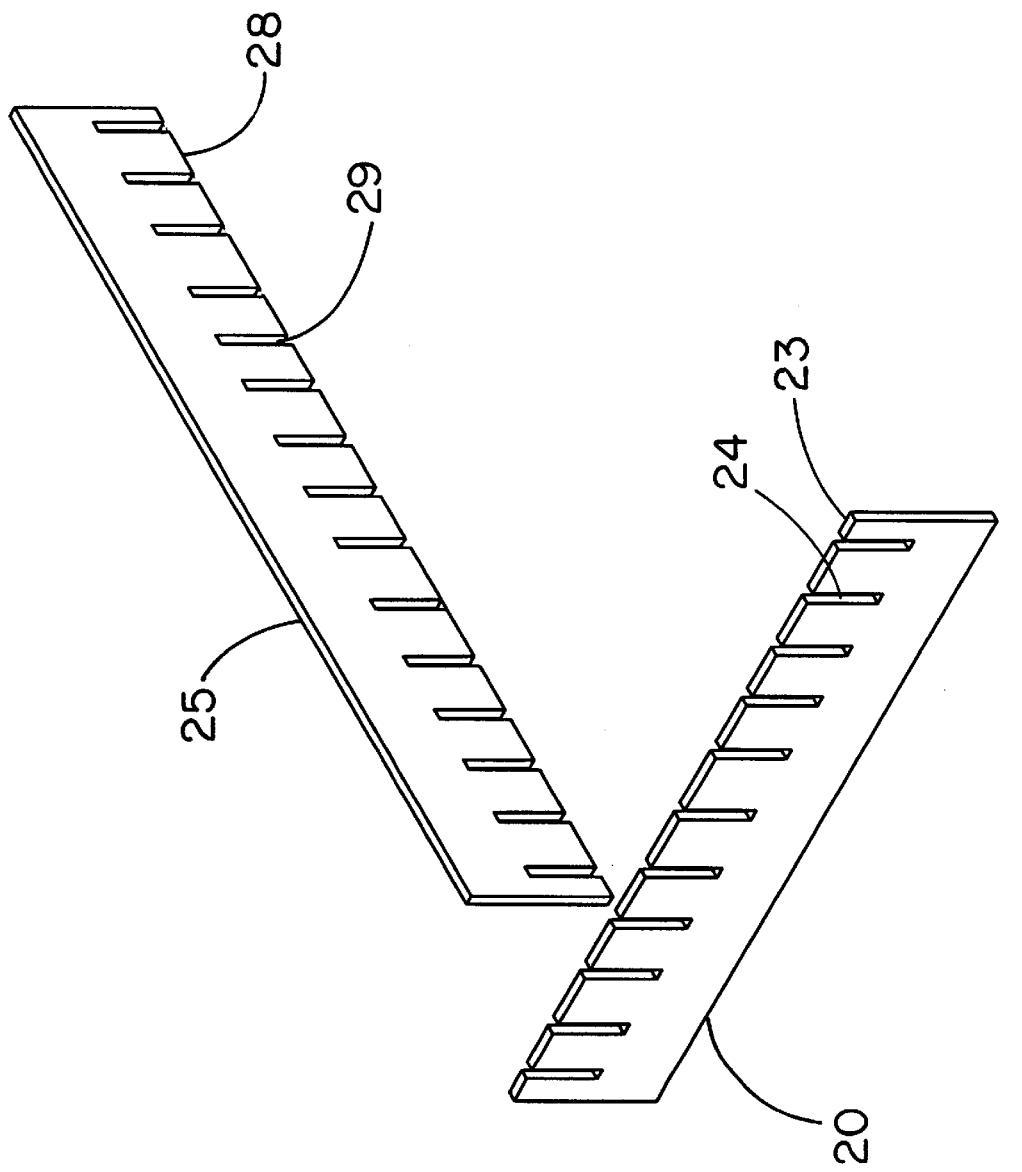
FIG. 6 is a schematic perspective view of the present invention showing the intermediate and interjacent walls.

With reference now to the drawings, and in particular to FIGS. 1 through 7 thereof, a new sliding storage device for the bed of a truck embodying the principles and concepts of the present invention and generally designated by the reference numeral 10 will be described.

As best illustrated in FIGS. 1 through 7, the sliding storage device for the bed of a truck 10 generally comprises a sliding storage device for the bed of a truck 10 that includes a bottom wall and a pair of side walls. The sliding storage device 10 comprises a housing 11. The housing 11 includes a bottom wall 12, a first side wall 13, a second side wall 14, an elongated front wall 15 and an elongated back wall 16 such that the housing 11 has an open top. The bottom wall 12 of the housing 11 extends beyond the side walls 13 and 14 such that a pair of flanges 19 are defined. Each of the walls includes an inner surface 17 and an outer surface 18.

In the housing 11 there are a plurality of intermediate walls 20. Each of the intermediate walls 20 includes a first end 21 and a second end 22. Each of the intermediate walls 20 includes a length generally equal to the first and second side walls 13 and 14. Each of the first ends 21 selectively contacts the inner surface 17 of the elongated front wall 15. Each of the second ends 22 selectively contacts the inner surface 17 of the elongated back wall 16. Each of the intermediate walls 20 includes a top edge 23 that include a plurality of spaced notches 24 therein.

There are also a plurality of interjacent walls 25 located in the housing 11. Each of the interjacent walls 25 includes a first end 26 and a second end 27. Each of the interjacent walls 25 includes a length generally equal to the front and back walls 15 and 16. Each of the first ends 26 of the interjacent walls 25 selectively contacts the inner surface 17 of the first side wall 14. Each of the second ends 27 of the interjacent walls 25 selectively contacts the inner surface 17 of the second side wall 15. Each of the interjacent walls 25 includes a bottom edge 28 that includes a plurality of spaced slits 29 therein. In an embodiment the notches 24 of the intermediate walls 20 may releasably engage the slits 29 of the interjacent walls 25. In an embodiment the intermediate walls 20 and the interjacent walls 25 may be positioned in the housing. The notches 24 and the slits 29 allow the intermediate walls 20 and the interjacent walls 25 to be moved to make a plurality of compartments of varying sizes.

The sliding storage device 10 also includes a door portion 30. The door portion comprises a panel 31 that includes a first side 32 and a second side 33, a first edge 34, a second edge 35, a third edge 36 and a fourth edge 37. The door portion 30 prevents the contents of the housing 11 from escaping.

There is a hinging means 38 for hingedly coupling the first edge 34 of the panel 31 to a top edge of the front wall 15. The panel 31 is selectively positioned between an open position and a closed position. The second side 33 of the panel 31 may be used as a working surface when it is in an open position.

The sliding storage device also includes a pair of legs 39. The pair of legs 39 includes a first end 40 and a second end 41. The first end 40 is pivotally coupled to and extending away from first side 32 of the door portion 30. Each of the legs comprises a first portion 42. The first portion 42 includes a free end 43. The free end 43 includes a opening 44 therein. The first portion 42 is hingedly coupled to the first side 32 of the door portion. Each of the legs 39 being coupled to the first side 32 as to properly support the door portion 30 while being used as a working surface.

A second portion of each of the legs includes a first end 46 and a second end 47. The first end 46 is movably extendable into the opening 44 of the first portion 42 such that the first portion 42 and the second portion 45 are selectively telescoping.

The slide storage device also includes a set of rail members 48. The set of rail members 48 comprises a pair of female slide rails 49. Each of the female slide rails 49 comprises an elongated vertical wall 50 that includes a first horizontal wall 56 and a second horizontal wall 57 integrally coupled thereto and extending away from a respective top edge 51 and bottom edge 52 of the vertical wall 50. The vertical wall 50 includes a first end 53 and a second end 54. The vertical wall 50 includes an aperture 55 therein. The aperture 55 is positioned generally adjacent to the first end 53 of the female slide rail 49.

Each of the female rail slides includes a pair of tabs. Each of the tabs 58 includes a top surface 59 and a bottom surface 60. The top surface 59 is integrally coupled to a bottom surface of the second horizontal wall 57 of the female slide rail 49 such that the tabs 58 extend away from the female slide rail 48. Each of tabs 58 includes a hole 61 therein extending through the top surface 59 and the bottom surface 60. A fastening means 62 is removably extended through the hole 61 of each of the tabs 58. In an embodiment the fastening in cans 61 securably couples each of the female slide rails 49 to the bottom wall of the bed. Each of the tabs 58 is orientated generally parallel to the bed of the truck. The female slide rails 49 each have a generally U-shape.

There is also a pair of male slide rails 63. Each of the male slide rails 63 comprises an elongated member 64 that includes a first end 65, a second end 66, a front surface 67 and a back surface 68, a top edge 69 and a bottom edge 70.

Each of the male slide rails 63 include a plurality of shafts 71. The shafts 71 include a first end 72 and a second end 73. The second end 73 of each of the shafts 71 is securably coupled to the second surface 66 of the male slide rail 63. Each of the shafts 71 is orientated generally perpendicular to the male slide rail 63.

The shafts 71 include a plurality of wheel members 74. Each of the wheel members 74 is rotatably coupled to the second end 73 of one of the shafts 71. One of the flanges 19 of the housing is movably positioned between the wheel members 74. The first end 65 of the male slide rail 63 is movably extendable into the second end 54 of the female slide rail 48. The front surface 67 of the male rail 63 includes an aperture 85 therein. The aperture 85 is positioned generally adjacent to the second end 66 of the male slide rail 63. The shafts 71 are generally divided into a top row and a bottom row with the flange being positioned between the wheel members 74 of the top row and the bottom row.

The set of rail members 48 include a cross bar 75. The cross bar 75 includes a pair of ends 76. Each of the ends 76 is integrally coupled to a middle portion of each of the female slid rails, the cross bar is orientated generally perpendicular to the pair of female slide rails.

The set of rail members 48 also include a cross member 78. The cross member 78 includes a pair of ends 79, each of the ends 79 is integrally coupled to the bottom edge 70 of each of the male slide rails 63. The cross member 78 is positioned generally adjacent to the second end 66 of each of the mail slide rails 63. The cross member 78 is orientated generally perpendicular to the pair of male slide rails 63.

The set of rail members 48 additionally includes a locking means 81 for locking the male slide rail 63 in the female slide rail 49. The locking means 81 comprises a rod 82. The rod 82 includes a first end 83 and a second end 84. The first end 83 of the rod 82 is removably positioned in the aperture 55 of the female rail 49 and in the aperture 85 of the male slide rail 63. In an embodiment each of the male slide rails 63 may extendably move in one of the female slide rails 49.

In use, the housing 11 is moved in a back and forth motion, on the set of rail members, 48 extending in and out of the bed of the truck. The door portion 30 is may be opened to access the compartments in the housing 11. The door portion may also be used as a work surface when the pair of legs 39 are extended to the ground, thereby supporting the door portion 30 in the open position. When the truck is in motion the locking means 81 may be inserted into the female slide rail 49 and the male slide rail 63 locking the two together.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sliding storage device for the bed of a truck having a bottom wall and a pair of side walls, said sliding storage device comprising:

a housing, said housing having a bottom wall, a first side wall, a second side wall, an elongated front wall and an elongated back wall such that said housing has an open top, said bottom wall of said housing extending beyond said side walls such that a pair of flanges are defined;

a set of rail members, said set of rail members comprising; a pair of female slide rails and a pair of male slide rails, each of said male slide rails being movably extended in one of said female slide rails;

wherein said housing is mounted on and extends between said pair of male slide rails.

2. The sliding storage device of claim 1, further comprising:

a plurality of intermediate walls, each of said intermediate walls having a first end and a second end, each of said intermediate walls having a length generally equal to said first and second side walls, each of said first ends selectively contacting said inner surface of said front wall, each of said second ends selectively contacting said inner surface of said back wall, each of said intermediate walls having a top edge having a plurality of spaced notches therein; and a plurality of interjacent walls, each of said interjacent walls having a first end and a second end, each of said interjacent walls having a length generally equal to said front and back walls, each of said first ends of said interjacent walls selectively contacting said inner surface of said first side wall, each of said second ends of said interjacent walls selectively contacting said inner surface of said second side wall, each of said interjacent walls having a bottom edge having a plurality of spaced slits therein, wherein said notches of said intermediate walls may releasably engage said slits of said interjacent walls, wherein said intermediate walls and said interjacent walls may be positioned in said housing.

3. The sliding storage device of claim 1, further comprising:

a door portion, said door portion comprising a panel having a first side and a second side, a first edge, a second edge, a third edge and a fourth edge; and a hinging means for hingedly coupling said first edge of said panel to a top edge of said front wall, said panel being selectively positioned between an open position and a closed position.

4. The sliding storage device of claim 3, further comprising:

a pair of legs, each of said legs having a first end and a second end, said first end being pivotally coupled to and extending away from first side of said door portion.

5. The sliding storage device of claim 3, wherein each of said legs comprises:

a first portion having a free end, said free end having a opening therein, said first portion being hingedly coupled to said first side of said door portion; and a second portion of said leg having a first end and a second end, said first end being movably extendable into said opening of said first portion such that said first portion and said second portion are selectively telescoping.

6. The sliding storage device of claim 1, wherein:

said female slide rail has a first horizontal wall and a second horizontal wall integrally coupled thereto and extending away therefrom, said female slide rail having a first end and a second end; and said male slide rail has an elongated member having a first end, a second end, a front surface and a back surface, a top edge and a bottom edge.

7. The sliding storage device of claim 6, wherein:

said male slide rail has a plurality of shafts having a first end and a second end, said second end of each of said shafts being securably coupled to said second surface of said male slide rail, a plurality of wheel members, each of said wheel members being rotatably coupled to said second end of one of said shafts, wherein each of said male slide rails may extendably move in one of said female slide rails.

8. The sliding storage device of claim 6, wherein:

said vertical wall of said female slide rail has an aperture therein, said aperture being positioned generally adjacent to said first end of said female slide rail; and said male rail has a aperture therein, said aperture being positioned generally adjacent to said second end of said male slide rail.

9. The sliding storage device of claim of claim 8, further comprising:

a locking means for locking said male slide rail in said female slide rail, said locking means comprising a rod, said rod having a first end and a second end, said first end of said rod being removably positioned in said hole of said female rail member and in said aperture of said male slide rail member.

10. The sliding storage device of claim 6, further comprising:

a pair of tabs, each of said tabs having a top surface and a bottom surface, said top surface being integrally coupled to a bottom surface of said second horizontal wall of said female slide rail such that said tabs extend away from said female slide rail, each of tabs having a hole therein extending through said top surfaces and said bottom surface, a fastening means being removably extended through said hole of each of said tabs, wherein said fastening means securably couples each of said female slide rails to the bottom wall of the bed.

11. The sliding storage device of claim 7, wherein: each of said shafts is orientated generally perpendicular to said male slide rail.

12. The sliding storage device of claim 6, wherein said first end of said male slide rail is movably extendable into said second end of said female slide rail.

13. The sliding storage device of claim 6, further comprising:

a cross bar having a pair of ends, each of said ends being integrally coupled to a middle portion of each of said female slide rails, said cross bar being orientated generally perpendicular to said pair of female slide rails.

14. The sliding storage device of claim 6, further comprising:

a cross member, said cross member having a pair of ends, each of said ends being integrally coupled to said bottom edge of each of said male slid rails, said cross member being positioned generally adjacent to said second end of each of said mail slide rails, said cross member being orientated generally perpendicular to said pair of male slide rails.

15. A sliding storage device for the bed of a truck having a bottom wall and a pair of side walls, said sliding storage device comprising:

a housing, said housing having a bottom wall, a first side wall, a second side wall, an elongated front wall and an elongated back wall such that said housing has an open top, said bottom wall of said housing extending beyond said side walls such that a pair of flanges are defined, each of said walls having an inner surface and an outer surface;

a plurality of intermediate walls, each of said intermediate walls having a first end and a second end, each of said intermediate walls having a length generally equal to said first and second side walls, each of said first ends selectively contacting said inner surface of said front wall, each of said second ends selectively contacting said inner surface of said back wall, each of said intermediate walls having a top edge having a plurality of spaced notches therein;

a plurality of interjacent walls, each of said interjacent walls having a first end and a second end, each of said interjacent walls having a length generally equal to said front and back walls, each of said first ends of said interjacent walls selectively contacting said inner surface of said first side wall, each of said second ends of said interjacent walls selectively contacting said inner surface of said second side wall, each of said interjacent walls having a bottom edge having a plurality of spaced slits therein, wherein said notches of said intermediate walls may releasably engage said slits of said interjacent walls, wherein said intermediate walls and said interjacent walls may be positioned in said housing;

a door portion, said door portion comprising a panel having a first side and a second side, a first edge, a second edge, a third edge and a fourth edge;

a hinging means for hingedly coupling said first edge of said panel to a top edge of said front wall, said panel being selectively positioned between an open position and a closed position;

a pair of legs, each of said legs having a first end and a second end, said first end being pivotally coupled to and extending away from first side of said door portion, each of said legs comprising;
  a first portion, said first portion having a first portion having a free end, said free end having a opening therein, said first portion being hingedly coupled to said first side of said door portion;
  a second portion, said second portion of said leg having a first end and a second end, said first end being movably extendable into said opening of said first portion such that said first portion and said second portion are selectively telescoping;
a set of rail members, said set of rail members comprising;
  a pair of female slide rails, each of said female slide rails comprising;
    an elongated vertical wall having a first horizontal wall and a second horizontal wall integrally coupled thereto and extending away therefrom, a respective top edge and bottom edge of said vertical wall, said vertical wall having a first end and a second end, said vertical wall having an aperture therein, said aperture being positioned generally adjacent to said first end of said female slide rail;
    a pair of tabs, each of said tabs having a top surface and a bottom surface, said top surface being integrally coupled to a bottom surface of said second horizontal wall of said female slide rail such that said tabs extend away from said female slide rail, each of tabs having a hole therein extending through said top surfaces and said bottom surface, a fastening means being removably extended through said hole of each of said tabs, wherein said fastening means securably couples each of said female slide rails to the bottom wall of said bed;
  a pair of male slide rails, each of said male slide rails comprising;
    an elongated member having a first end, a second end, a front surface and a back surface, a top edge and a bottom edge;
    a plurality of shafts having a first end and a second end, said second end of each of said shafts being securably coupled to said second surface of said male slide rail, each of said shafts being orientated generally perpendicular to said male slide rail;
    a plurality of wheel members, each of said wheel members being rotatably coupled to said second end of one of said shafts, one of said flanges of said housing being movably positioned between said wheel members, said first end of said male slide rail being movably extendable into said second end of said female slide rail, said front surface of said male rail having a aperture therein, said aperture being positioned generally adjacent to said second end of said male slide rail;
  a cross bar, said cross bar having a pair of ends, each of said ends being integrally coupled to a middle portion of each of said female slid rails, said cross bar being orientated generally perpendicular to said pair of female slide rails;
  a cross member, said cross member having a pair of ends, each of said ends being integrally coupled to said bottom edge of each of said male slid rails, said cross member being positioned generally adjacent to said second end of each of said mail slide rails, said cross member being orientated generally perpendicular to said pair of male slide rails;
  a locking means for locking said male slide rail in said female slide rail, said locking means comprising a rod, said rod having a first end and a second end, said first end of said rod being removably positioned in said hole of said female rail member and in said aperture of said male slide rail member; and
    wherein each of said male slide rails may extendably move in one of said female slide rails.

* * * * *